US012801752B2

(12) United States Patent
Byam

(10) Patent No.: US 12,801,752 B2
(45) Date of Patent: Nov. 17, 2026

(54) SYSTEM AND METHOD FOR DETERMINING AND MANAGING SOFTWARE PATCH VULNERABILITIES VIA A DISTRIBUTED NETWORK

(71) Applicant: BANK OF AMERICA CORPORATION, Charlotte, NC (US)

(72) Inventor: Jackson Byam, Seattle, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 202 days.

(21) Appl. No.: 18/367,276

(22) Filed: Sep. 12, 2023

(65) Prior Publication Data

US 2025/0086285 A1 Mar. 13, 2025

(51) Int. Cl.
*G06F 8/65* (2018.01)
*G06F 21/57* (2013.01)

(52) U.S. Cl.
CPC .............. *G06F 21/577* (2013.01); *G06F 8/65* (2013.01); *G06F 2221/033* (2013.01)

(58) Field of Classification Search
CPC .... G06F 8/71; G06F 21/577; G06F 2221/033; G06F 8/65
USPC ............................................................ 726/25
See application file for complete search history.

(56) References Cited

U.S. PATENT DOCUMENTS 9,176,727 B2 11/2015 Bhasin et al.
10,732,957 B2 8/2020 Dattatri et al.
11,106,444 B2 8/2021 Gao et al.
11,176,024 B1 * 11/2021 Fernandes de Oliveira ................ G06F 11/3688
11,301,232 B2 4/2022 Bhupati et al.
11,907,696 B2 2/2024 Livne et al.
12,067,502 B1 8/2024 Stave et al.
2008/0271025 A1 10/2008 Gross et al.
2015/0186125 A1 7/2015 Avery et al.
2016/0103673 A1 4/2016 Curran et al.
2020/0019393 A1 * 1/2020 Vichare .................. G06N 20/00
2020/0057625 A1 * 2/2020 Livne ......................... G06F 8/65

(Continued)

OTHER PUBLICATIONS

Hudepohl, J.P., Aud, S.J., Khoshgoftaar, T.M., Allen, E.B., Mayrand, J. "Integrating metrics and models for software risk assessment". Oct. 30, 1996-Nov. 2, 1996. IEEE. Proceedings of ISSRE '96: 7th International Symposium on Software Reliability Engineering. doi: 10.1109/ISSRE.1996.55870 (Year: 1996).*

*Primary Examiner* — Nasser M Goodarzi
(74) *Attorney, Agent, or Firm* — Moore & Van Allen PLLC; Nicholas C. Russell

(57) ABSTRACT

Systems, computer program products, and methods are described herein for determining and managing software patch vulnerabilities via a distributed network. The method includes determining a patch success indication of a patch applied to a first end-point device based on one or more device metrics. The patch success indication is based on a change of the one or more device metrics between a first time before the patch was applied and a second time after the patch was applied. The method also includes determining a similarity rating between the first end-point device and a second end-point device. The method further includes determining a patch success prediction for the second end-point device. The patch success prediction is based on the similarity rating and the patch success indication. The method still further includes causing a transmission of the patch to the second end-point device.

17 Claims, 6 Drawing Sheets

(56) References Cited

U.S. PATENT DOCUMENTS

| | | | | |
|---|---|---|---|---|
| 2021/0273968 | A1* | 9/2021 | Shaieb | G06F 8/65 |
| 2023/0039730 | A1 | 2/2023 | Li et al. | |
| 2023/0058477 | A1* | 2/2023 | Jiang | G06F 8/65 |
| 2023/0078359 | A1* | 3/2023 | Parthasarathy | G06F 11/3668 717/168 |
| 2023/0125904 | A1 | 4/2023 | Willett et al. | |
| 2024/0330479 | A1* | 10/2024 | Kamate | G06F 21/577 |

* cited by examiner

SYSTEM AND METHOD FOR DETERMINING AND MANAGING SOFTWARE PATCH VULNERABILITIES VIA A DISTRIBUTED NETWORK

TECHNOLOGICAL FIELD

Example embodiments of the present disclosure relate generally to network security and, more particularly, to determining and managing software patch vulnerabilities via a distributed network.

BACKGROUND

Software patches are often applied across multiple different devices. However, one size fits all patches create issues with different devices, as a single different application may cause unintended patch effects. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiments, a system for determining and managing software patch vulnerabilities via a distributed network is provided. The system includes at least one non-transitory storage device containing instructions and at least one processing device coupled to the at least one non-transitory storage device. The at least one processing device, upon execution of the instructions, is configured to determine a patch success indication of a patch applied to a first end-point device associated with a network based on one or more device metrics of the first end-point device. The patch success indication is based on a change of the one or more device metrics between a first time before the patch was applied and a second time after the patch was applied. The at least one processing device, upon execution of the instructions, is also configured to determine a similarity rating between the first end-point device and a second end-point device. The similarity rating is based on a comparison of one or more first device applications installed on the first end-point device and one or more second device applications installed on the second end-point device. The at least one processing device, upon execution of the instructions, is further configured to determine a patch success prediction for the second end-point device. The patch success prediction is based on the similarity rating between the first end-point device and the second end-point device and the patch success indication. The at least one processing device, upon execution of the instructions, is still further configured to cause a transmission of the patch to the second end-point device in an instance in which the patch success prediction indicates a potential success.

In various embodiments, the at least one processing device, upon execution of the instructions, is also configured to receive a transmission of a patch to be applied to the first end-point device associated with the network and cause the patch to be applied to the first end-point device associated with the network.

In various embodiments, the at least one processing device, upon execution of the instructions, is also configured to determine the one or more first device applications installed on the first end-point device.

In various embodiments, the at least one processing device, upon execution of the instructions, is also configured to determine the first end-point device from a plurality of end-point devices based on one or more common applications with the second end-point device.

In various embodiments, the at least one processing device, upon execution of the instructions, is also configured to train a machine learning model to use to determine the similarity rating.

In various embodiments, the at least one processing device, upon execution of the instructions, is also configured to determine one or more end-point devices of a plurality of end-point devices associated with the network to apply the patch based on at least one of the one or more first device applications.

In various embodiments, the patch success prediction indicates a potential success in an instance in which the similarity rating is above a certain threshold and the patch success indication indicates the patch was successful on the first end-point device.

In another example embodiment, a computer program product for determining and managing software patch vulnerabilities via a distributed network is provided. The computer program product includes at least one non-transitory computer-readable medium having computer-readable program code portions embodied therein. The computer-readable program code portions include one or more executable portions configured to determine a patch success indication of a patch applied to a first end-point device associated with a network based on one or more device metrics of the first end-point device. The patch success indication is based on a change of the one or more device metrics between a first time before the patch was applied and a second time after the patch was applied. The computer-readable program code portions include one or more executable portions also configured to determine a similarity rating between the first end-point device and a second end-point device. The similarity rating is based on a comparison of one or more first device applications installed on the first end-point device and one or more second device applications installed on the second end-point device. The computer-readable program code portions include one or more executable portions further configured to determine a patch success prediction for the second end-point device. The patch success prediction is based on the similarity rating between the first end-point device and the second end-point device and the patch success indication. The computer-readable program code portions include one or more executable portions still further configured to cause a transmission of the patch to the second end-point device in an instance in which the patch success prediction indicates a potential success.

In various embodiments, the computer-readable program code portions include one or more executable portions also configured to receive a transmission of a patch to be applied to the first end-point device associated with the network and cause the patch to be applied to the first end-point device associated with the network.

In various embodiments, the computer-readable program code portions include one or more executable portions also configured to determine the one or more first device applications installed on the first end-point device.

In various embodiments, the computer-readable program code portions include one or more executable portions also configured to determine the first end-point device from a plurality of end-point devices based on one or more common applications with the second end-point device.

In various embodiments, the computer-readable program code portions include one or more executable portions also configured to train a machine learning model to use to determine the similarity rating.

In various embodiments, the computer-readable program code portions include one or more executable portions also configured to determine one or more end-point devices of a plurality of end-point devices associated with the network to apply the patch based on at least one of the one or more first device applications.

In various embodiments, the patch success prediction indicates a potential success in an instance in which the similarity rating is above a certain threshold and the patch success indication indicates the patch was successful on the first end-point device.

In still another example embodiment, a method for determining and managing software patch vulnerabilities via a distributed network is provided. The method includes determining a patch success indication of a patch applied to a first end-point device associated with a network based on one or more device metrics of the first end-point device. The patch success indication is based on a change of the one or more device metrics between a first time before the patch was applied and a second time after the patch was applied. The method also includes determining a similarity rating between the first end-point device and a second end-point device. The similarity rating is based on a comparison of one or more first device applications installed on the first end-point device and one or more second device applications installed on the second end-point device. The method further includes determining a patch success prediction for the second end-point device. The patch success prediction is based on the similarity rating between the first end-point device and the second end-point device and the patch success indication. The method still further includes causing a transmission of the patch to the second end-point device in an instance in which the patch success prediction indicates a potential success.

In various embodiments, the method also includes receiving a transmission of a patch to be applied to the first end-point device associated with the network and causing the patch to be applied to the first end-point device associated with the network.

In various embodiments, the method also includes determining the first end-point device from a plurality of end-point devices based on one or more common applications with the second end-point device. In various embodiments, the method also includes training a machine learning model to use to determine the similarity rating.

In various embodiments, the method also includes determining one or more end-point devices of a plurality of end-point devices associated with the network to apply the patch based on at least one of the one or more first device applications.

In various embodiments, the patch success prediction indicates a potential success in an instance in which the similarity rating is above a certain threshold and the patch success indication indicates the patch was successful on the first end-point device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
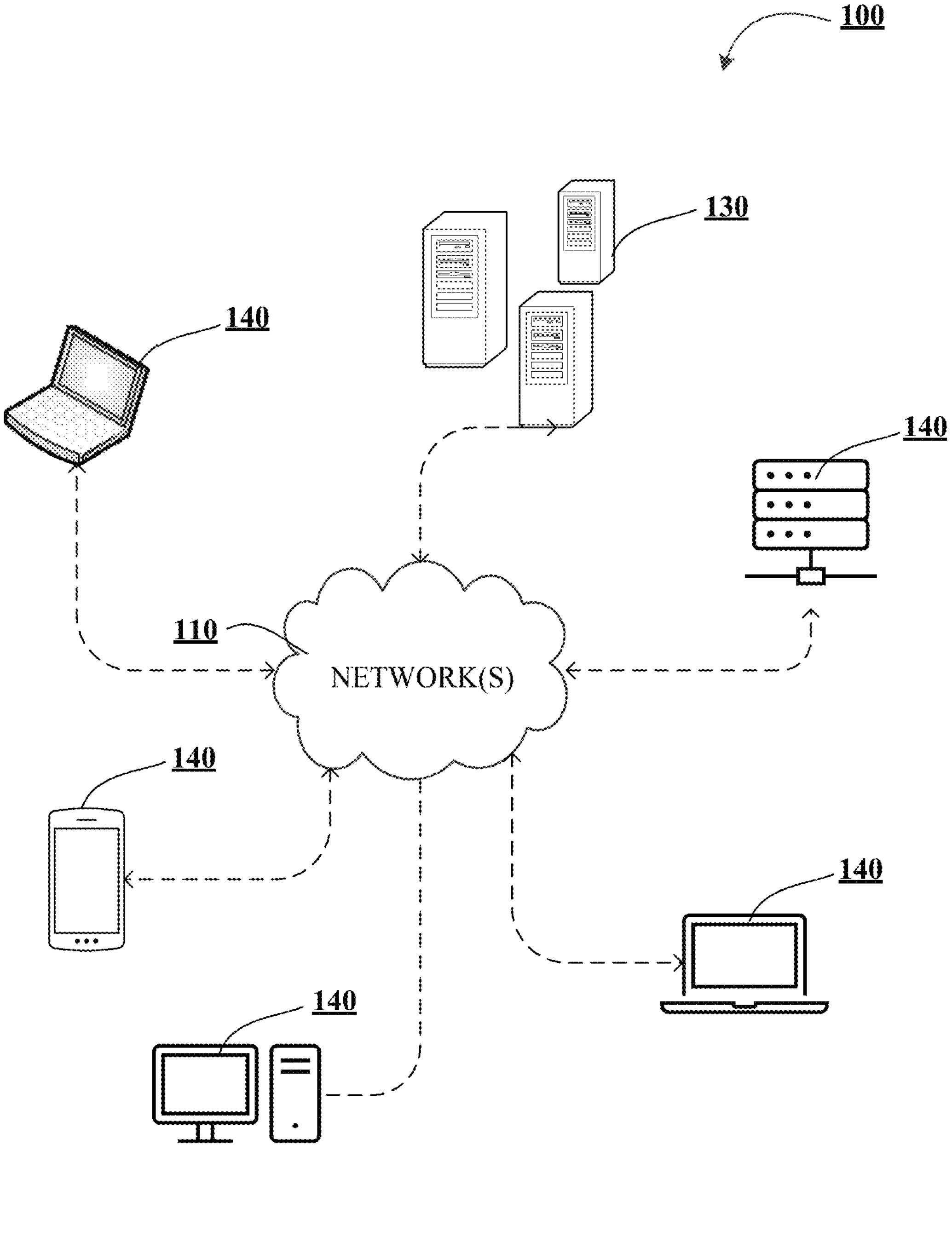
Figure 1B:
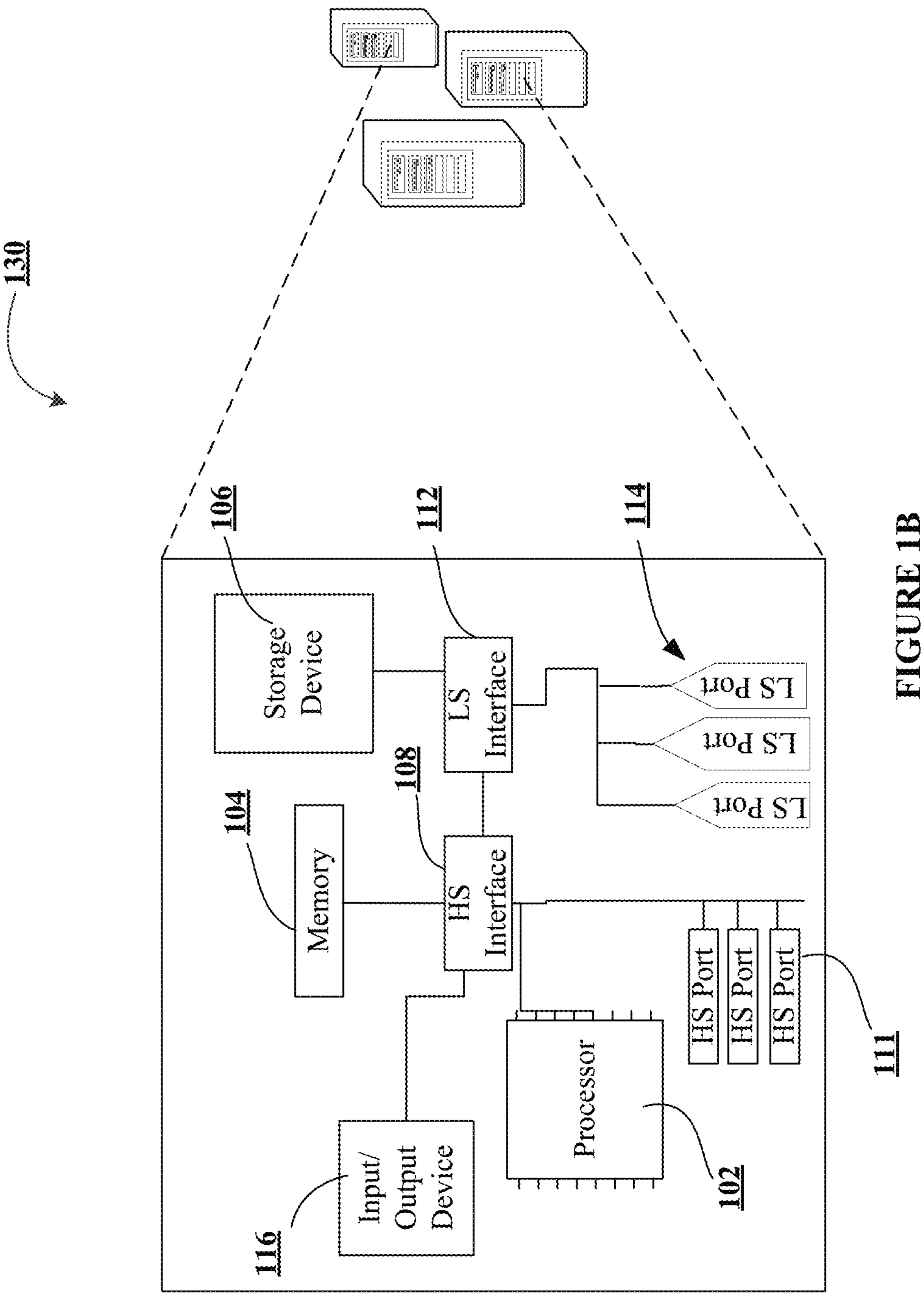
Figure 1C:
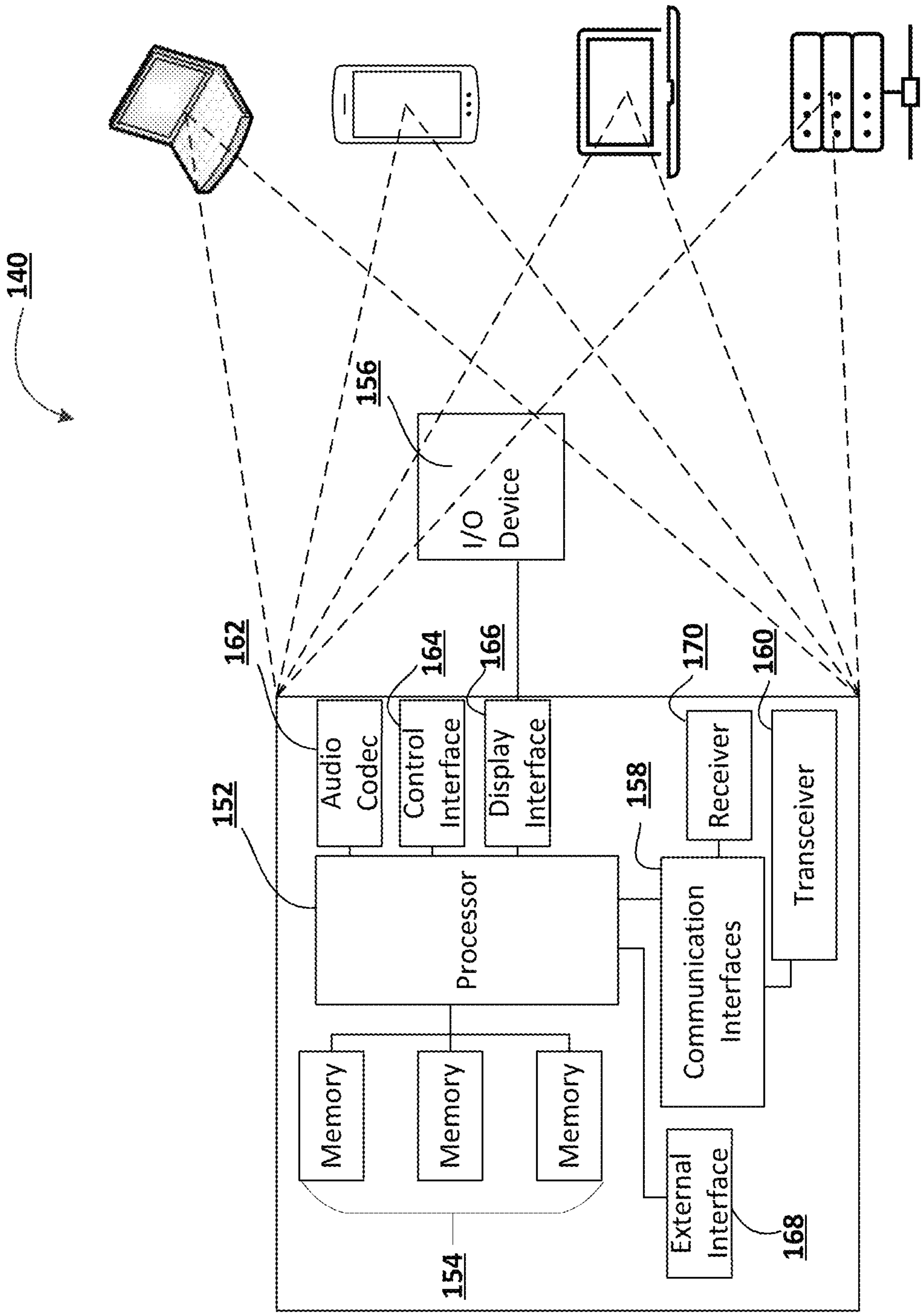
Figure 2:
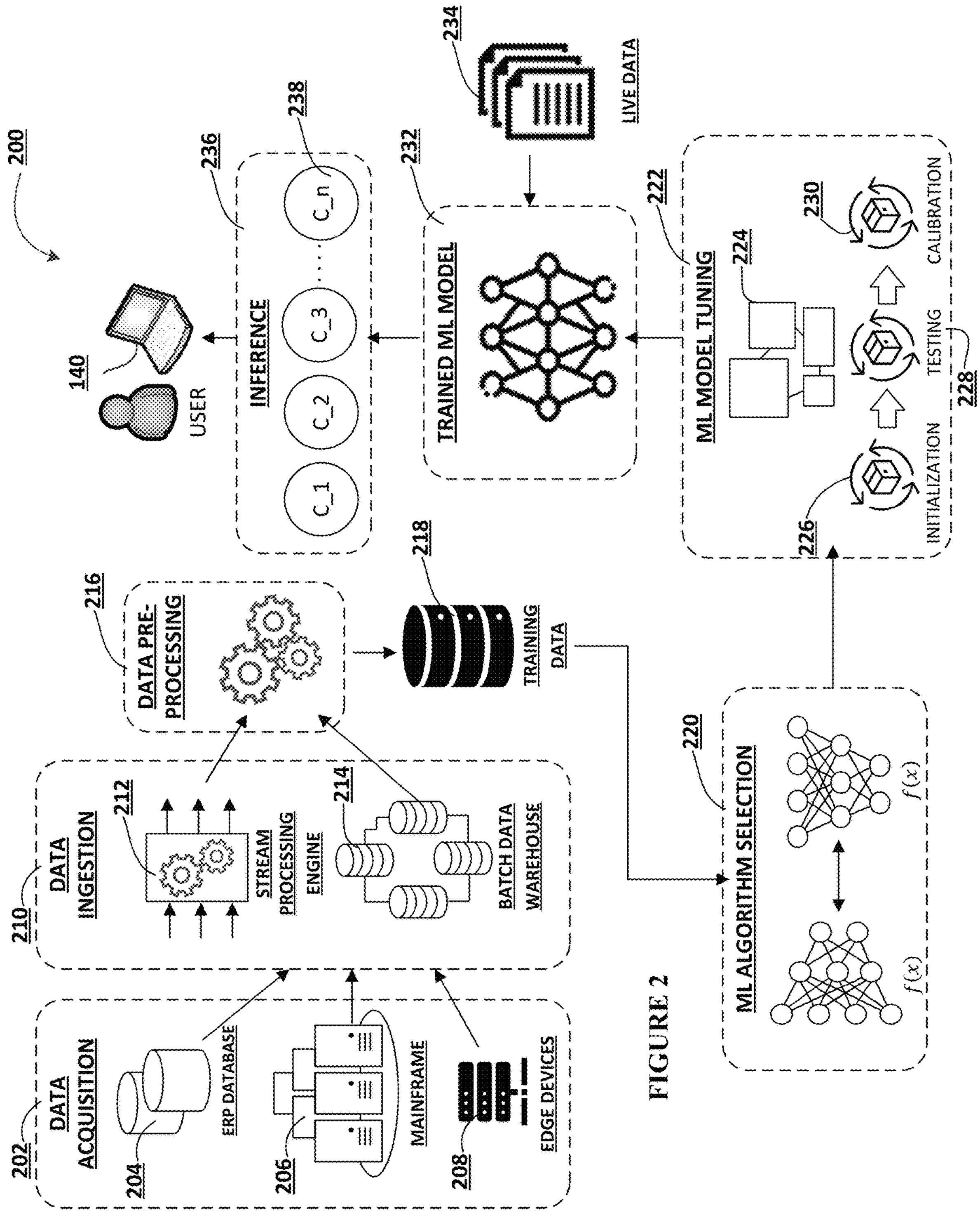
Figure 3A:
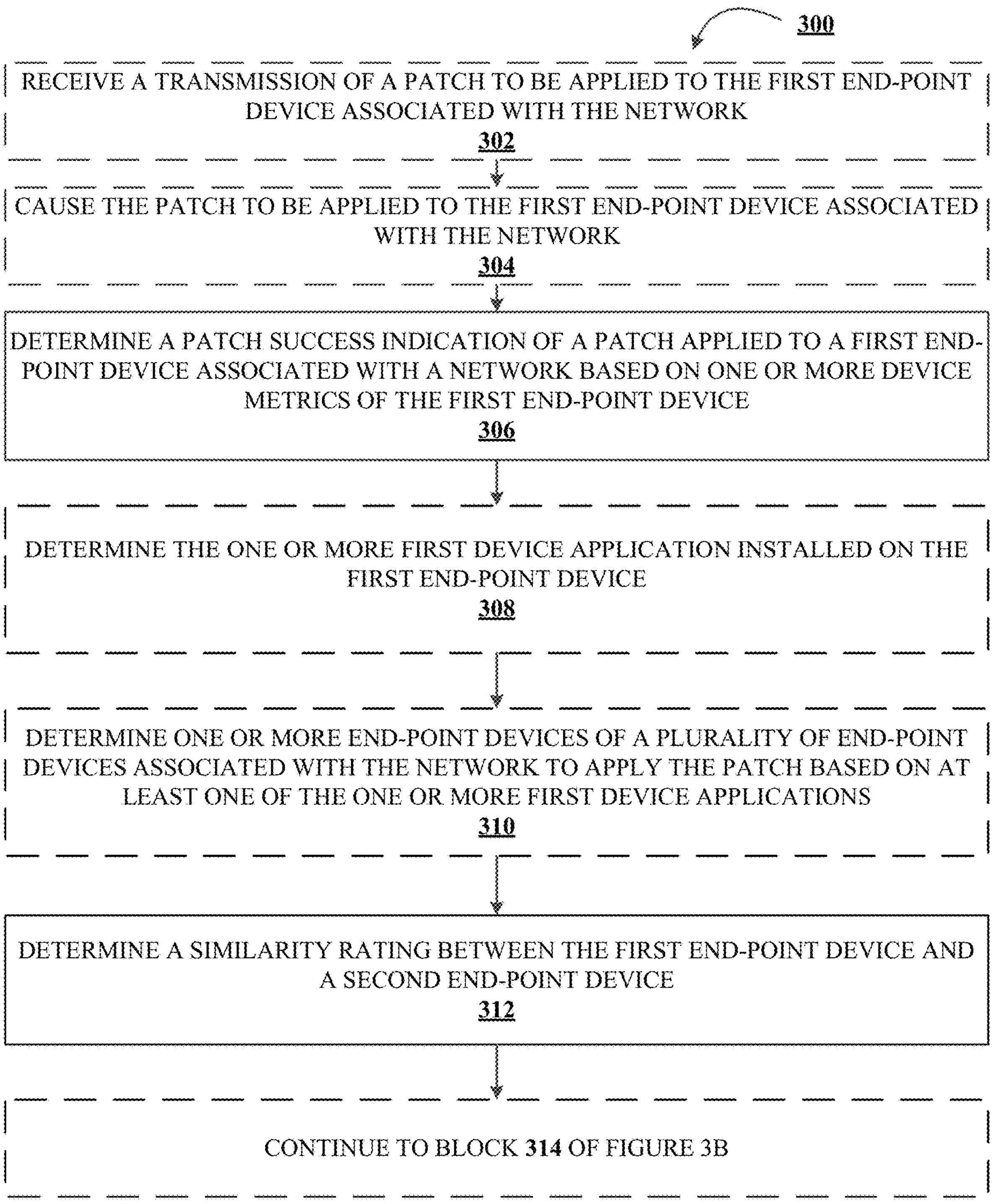
Figure 3B:
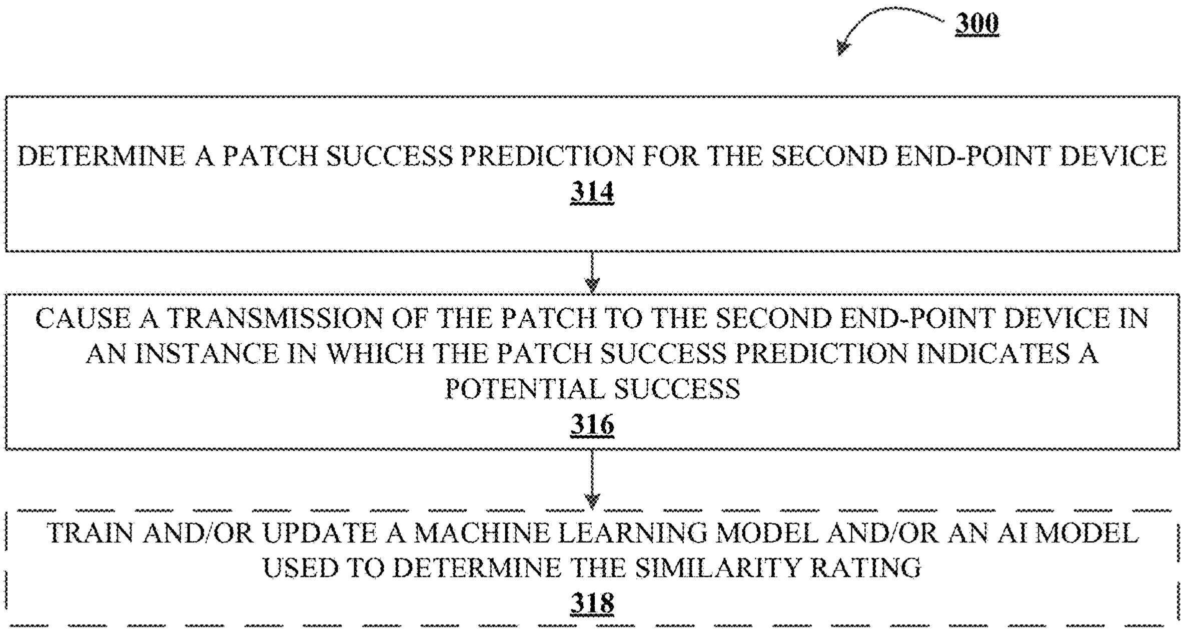

FIGS. 1A-1C illustrate technical components of an example distributed computing environment for determining and managing software patch vulnerabilities via a distributed network, in accordance with various embodiments of the present disclosure;

FIG. 2 illustrates an example machine learning (ML) subsystem architecture 200 used in accordance with various embodiments of the present disclosure; and FIGS. 3A and 3B illustrate a process flow for determining and managing software patch vulnerabilities via a distributed network, in accordance with various embodiments of the present disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data. An "entity" can encompass a wide range of organizations, such as institutions, groups, associations, financial institutions, establishments, companies, unions, authorities, and similar entities. The common factor among these entities is their utilization of information technology resources for processing substantial amounts of data. As such, an "entity" in this context denotes any organization or institution that employs information technology resources capable of processing large volumes of data, which can pertain to different aspects of the entity's operations.

As described herein, a "user" may be an individual associated with an entity. As such, in some embodiments, the user may be an individual having past relationships, current relationships or potential future relationships with an entity (e.g., a customer at a financial institution).

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device. Additionally, as used herein, a "resource" may also encompass computing or network resources. This broader definition of a resource includes elements such as computational power, storage capacity, network bandwidth, software applications, databases, virtual machines, servers, routers, switches, and other similar components associated with computing or network infrastructure.

As used herein, an "artificial intelligence" (AI) system is a computing framework designed to perform tasks that normally require human intelligence, such as understanding natural language, recognizing patterns, problem-solving, and making decisions. It is understood that these systems operate by mimicking the neural networks of humans in a simplified form. In some embodiments, they may consist of interconnected layers of nodes, often referred to as artificial neurons, that process information using dynamic state responses to external inputs. They are trained by feeding them large volumes of data and adjusting the connections between the nodes using complex mathematical algorithms based on the principles of statistics and calculus, allowing them to learn from this data. In some embodiments, an AI system may be stored and executed in various ways depending on the requirements of the specific implementation. It is understood that AI systems can be hosted on local machines, in data centers, or in the cloud. It is further understood that cloud-based AI systems are becoming increasingly common due to their scalability, cost-effectiveness, and the ability to handle vast amounts of data. AI systems may be employed for identifying data patterns and vulnerability vectors due to their ability to analyze large and complex datasets rapidly and accurately.

As used herein "machine learning" (ML), a subset of AI, may be utilized in some embodiments. ML algorithms learn from the data they process, enabling them to discover hidden insights and patterns that may not be apparent to human analysts. For instance, in cybersecurity, AI systems can analyze network traffic to identify patterns consistent with cyber threats or vulnerabilities, providing an effective tool for proactively safeguarding systems and data. It is understood that there are several types of ML algorithms, each suited to different types of tasks. These include supervised learning where the algorithm learns from labeled training data, and then applies what it has learned to new data. In further embodiments, unsupervised learning may employ unlabeled data and learn by identifying patterns and structures within it. Additionally, in some embodiments, reinforcement learning may involve an algorithm that learns by interacting with its environment and receives rewards or demerits based on its actions. Furthermore, semi-supervised learning may include a blend of supervised and unsupervised learning wherein various embodiments of the present disclosure employ the use of an algorithm which learns from a small amount of labeled data supplemented by a large amount of unlabeled data. Particularly regarding cybersecurity, ML may be used to identify patterns consistent with cyber vulnerabilities. The ML algorithm of various embodiments may analyze network traffic data, system logs, user behavior, or the like, and learn what "normal" activity looks like on an entity network infrastructure. Once the model has been trained on this data, it can then monitor network activity and identify anomalies or deviations from the normal pattern. These anomalies could potentially be cyber vulnerabilities, such as an intrusion, malicious activity, or use of a software vulnerability. This proactive approach to cybersecurity allows vulnerabilities to be detected and mitigated early, reducing the potential damage they may cause. In some embodiments, ML may provide valuable insights and automated decision-making capabilities across multiple entity communication channels.

Networks often need to implement software patches across network devices for security and/or efficiency purposes. However, such software patches are typically only tested on limited amounts of devices, leaving other devices on the network to be untested for the patch before actual deployment. As such, update patches can cause hardware and/or software on the network to break and/or otherwise result in decreased performance. There is little to be done that allows for a patch to be tested and/or deployed across every device on a network. A large network can have any number of connected devices with each connected device having any combination of applications. As such, software patches present a large security threat to network operations, as well as potential harm to both software operations and the underlying hardware. As such, the present disclosure improves the deployment and operations of software patches.

Various embodiments of the present disclosure allow for determining and managing software patch vulnerabilities via a distributed network. To do this, the system uses a peer-to-peer network that includes end-point devices connected to the network. An end-point device associated with the network may apply a patch and monitor one or more device metrics for changes based on the patch application. Using AI/ML models, other end-point devices can determine similar end-point devices (e.g., end-point devices with similar applications installed). Based on the performance of a patch on a similar end-point device, the compatibility of the patch on the end-point device can be determined. The patch may be received directly from said end-point device (e.g., the given end-point device may have made modifications to the patch to improve the patch operations). As such, patch deployment efficiency is improved, which results in improved network security and reduced dependence on centralized patch deployment.

FIGS. 1A-1C illustrate technical components of an example distributed computing environment for determining and managing software patch vulnerabilities via a distributed network, in accordance with an embodiment of the disclosure. As shown in FIG. 1A, the distributed computing environment 100 contemplated herein may include a system 130 (e.g., a network monitoring device), an end-point device(s) 140, and a network 110 over which the system 130 and end-point device(s) 140 communicate therebetween. In various embodiments, the system 130 may be embodied by one or more of the end-point devices 140. As such, any end-point device 140 may operate as the system 130.

FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to the shared communication within the network, the distributed network often also supports distributed processing. The network 110 may be a form of digital communication network such as a telecommunication network, a local area network ("LAN"), a wide area network ("WAN"), a global area network ("GAN"), the Internet, a satellite network, a cellular network, and/or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an example component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 (shown as "LS Interface") connecting to the memory 104, and a low-speed interface 112 connecting to low-speed expansion port 114 (shown as "LS Port") and storage device 106. Each of the components 102, 104, 106, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer-readable or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an example component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an example machine learning (ML) architecture 200, in accordance with an embodiment of the present disclosure. The ML subsystem architecture may be part of the components of the environment 100 (e.g., end-point device(s) 140). The ML subsystem architecture is used to detect and prevent malfeasant targeting of individual users in a network as discussed below in reference to FIGS. 3A and 3B. Namely, the ML subsystem architecture may be used to train the system to determine the similarity rating between end-point devices and/or determine similar end-point devices.

The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

FIGS. 3A and 3B illustrate a process flow 300 for determining and managing software patch vulnerabilities via a distributed network, in accordance with various embodiments of the present disclosure. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein. Additionally, ML/AI may also be used, such the AI/ML discussed in reference to FIG. 2.

In various embodiments, one or more of the end-point devices 140 associated with the network may be capable of executing one or more features of the process flow discussed herein. As such, each of the one or more of the end-point devices 140 associated with the network may include hardware to carry out the operations herein.

The present disclosure allows for end-point devices to be connected via a peer-to-peer network to share telemetry and data between end-point devices. An automated agent may be installed on each end-point device that collects data (e.g., device metric(s)) about processes running on the system, such as processing usage, network usage, and/or additional operating systems data points. All of the data that is generated may be passed through machine learning algorithms on each end-point device to determine if the patch (or update) is operating as intended and not causing harm to other applications or system settings. The processed data may then be pushed to other end-point devices via the peer-to-peer network to determine if the respective end-point device should request or otherwise receive the patch. In an instance in which the end-point device determines a patch is needed, the end-point device may automatically be able to request the patch from another end-point device on the network. As such, there is no need for a single patching server to push patches to individual machines. The benefit of a peer-to-peer network to share this data is each end-point device will receive data specific to other end-point device configurations and not just one single base image.

While the operations herein are discussed in reference to a first end-point device and a second end-point device, any number of end-point devices may be used in the operations herein. As such, the first end-point device may be different across different operations. For example, in a first example, an end-point device may have a patch and be a first end-point device for the operations discussed herein and in a second example, the same end-point device may be a second end-point device and receive a patch from another end-point device. Additionally, various numbers of end-point devices may be used in the operations herein (e.g., a first end-point device may transmit patches to multiple end-point devices).

Referring now to optional Block 302 of FIG. 3A, the method includes receiving a transmission of a patch to be applied to the first end-point device associated with the network. The patch may be received from another end-point device (e.g., an end-point device that has already deployed the patch). In various embodiments, one or more end-point devices may receive the patch from a centralized node (e.g., one or more end-point devices may receive an initial deployment of the patch).

In various embodiments, the patch may be any modification to existing code, replacement of existing code, and/or new code that may be used by an end-point device during one or more operations. The patch may be specific to one or more applications and/or related to device system operations. The patch may be originally generated for specifically deployment for one or more end-point devices.

The patch may be modifiable (e.g., an end-point device and/or a user associated with the end-point device may modify the patch based on the characteristics of the end-point device). The patch may also be transmittable, such that the first end-point device may transmit the patch (modified and/or not modified) to other end-point devices associated with the network.

Referring now to optional Block 304 of FIG. 3A, the method includes causing the patch to be applied to the first end-point device associated with the network. In various embodiments, the patch may be applied to the end-point device by the end-point device (e.g., automatically or manually by a user associated with the end-point device). Additionally or alternatively, the patch may be applied remotely. The patch may be applied by updating code associated with the first end-point device.

Referring now to Block 306 of FIG. 3A, the method includes determining a patch success indication of a patch applied to a first end-point device associated with a network based on one or more device metrics of the first end-point device. The patch success indication may indicate the success level of the patch implementation. For example, the patch success indication may indicate that the patch was successful, unsuccessful, or partially successful. The patch success indication may also indicate the operation conditions of the end-point device (e.g., the patch success indication may indicate whether the end-point device is operating correctly).

Device metric(s) may be any metrics associated with the operations of the end-point device, such as processing usage, component heat, network usage, component speed, network speed, and/or the like. Device metric(s) may also include information relating to network and/or end-point device vulnerability.

In various embodiments, the patch success indication may be based on a change of the one or more device metrics between a first time before the patch was applied and a second time after the patch was applied. The given end-point device may record or otherwise store the same device metric(s) over time. As such, an end-point device (e.g., the first end-point device) that applies a patch may have one or more device metrics recorded for one or more time periods (e.g., a first time) before the patch is applied. The one or more device metrics recorded for one or more time periods (e.g., a first time) before the patch is applied may be averaged or otherwise selected (e.g., mean, median, etc.) to generate baseline device metric(s) for the end-point device.

After the patch is applied to a given end-point device, the given end-point device may record the device metric(s) one or more times (e.g., a second time) and compare the device metric(s) with the like device metric from before the patch was applied (e.g., a first time). As such, the end-point device may determine the change between the one or more device metrics between a first time before the patch was applied and a second time after the patch was applied.

In an instance in which the change between the one or more device metrics between a first time before the patch was applied and a second time after the patch was applied is above a threshold value (e.g., more than a predetermined value), the end-point device may mark one or more of the device metric(s) for determining whether the patch is successful or not. For example, the patch being applied end-point device may be intended to affect one or more of the device metric(s) (e.g., a patch may be used to reduce processing usage), such that the change between given device metrics should be above a threshold value without the patch being unsuccessful, while the patch may not be intended to affect one or more of the device metric(s), such that the change between given device metrics being above a threshold value may indicate that the patch being unsuccessful.

In an instance in which the change between the one or more device metrics between a first time before the patch was applied and a second time after the patch was applied is below a threshold value (e.g., minimal or no change), the patch may have been successful. As discussed above, a patch may have expected effects on certain device metric(s) and not on other certain device metric(s), such that the change between the one or more device metrics between a first time before the patch was applied and a second time after the patch was applied should be minimal for device metric(s) that are not expected to have an effect (e.g., a patch directed to improving processing usage may not be intended to affect network usage). As such, the end-point device may determine whether each of the device metric(s) are expected to be affected by the patch and then determine whether the patch was successful based on the determination.

Referring now to optional Block 308 of FIG. 3A, the method includes determining the one or more first device application installed on the first end-point device. Each end-point device may have different device applications, such that the end-point device may indicate to other end-point devices one or more device applications. The end-point devices may determine the device applications for other end-point devices to determine similar end-point devices. For example, the second end-point device may determine the first end-point device (e.g., as discussed in reference to optional Block 310) based on the device applications on the plurality of end-point devices.

Referring now to optional Block 310 of FIG. 3A, the method includes determining one or more end-point devices of a plurality of end-point devices associated with the network to apply the patch based on at least one of the one or more first device applications. In various embodiments, the first end-point device may determine one or more similar end-point devices associated with the network based on the device applications on each of the end-point devices. For example, end-point devices that have one or more of the same device applications as the first end-point device may be selected to receive and/or otherwise apply the patch from the first end-point device.

In various embodiments, the one or more end-point devices that are selected to receive the patch may be determined to be similar to the first end-point device. A similar end-point device may have one or more overlapping device applications. The number of overlapping device applications that makes end-point devices similar may vary based on the system (e.g., the more overlapping device applications, the higher the amount of similarity to the end-point devices). For example, a high interest patch may be pushed only to end-point devices that are share a higher number of overlapping device applications. In various embodiments, the one or more end-point devices may be selected based on the similarity rating between the given end-point device and the first end-point device.

Referring now to Block 312 of FIG. 3A, the method includes determining a similarity rating between the first end-point device and a second end-point device. The similarity rating is based on a comparison of one or more first device applications installed on the first end-point device and one or more second device applications installed on the second end-point device. The more overlapping device applications, the higher the similarity rating. For example, in an instance in which the first end-point device has the same applications as the second end-point device, the similarity rating may be a maximum value, while a in an instance in which a first end-point device has no overlapping applications with the second end-point device, the similarity rating may be a minimum value.

In various embodiments, the similarity rating may be a numerical value (e.g., maximum value of 1 and minimum value of 0). In various embodiments, end-point devices may be determined to be similar in an instance in which the similarity rating is above a rating threshold. As such, end-point devices that have a similarity rating above the rating threshold are considered similar and the given end-point devices may transmit patches to and/or from one another.

In various embodiments, the end-point devices may determine which end-point devices to receive and/or transmit patches based on the similarity rating with each end-point device. For example, a second end-point device may have a higher similarity rating with the first end-point device than with a third end-point device, and as a result, the second end-point device may receive patches from the first end-point device and not the third end-point device).

In various embodiments, the similarity rating may be weighted to specific applications. In various embodiments, certain applications may be more important to patch performance than other applications. For example, a specific application may cause issues with a specific version of the patch and therefore similarity rating may be skewed to finding similar end-point devices based on the specific application. In various embodiments, the weighting may be automated (e.g., via ML/AI models, the system may determine more important application) and/or manual (e.g., a network administrator may designate a specific application to have a higher weight).

Referring now to Block 314 of FIG. 3B, the method includes determining a patch success prediction for the second end-point device. The patch success prediction indicates whether the patch would be a success on the second end-point device. In various embodiments, the patch success prediction may have a predication component (e.g., indicating a predication of potential success or failure) along with the confidence value (e.g., based on the similarity rating between the given end-point devices). As such, the patch success prediction may indicate the likely result of applying the patch to a given end-point device, along with the confidence value of such result. The higher the confidence value, the higher the probability that the predication was corrected.

In various embodiments, the patch success prediction is based on the similarity rating between the first end-point device and the second end-point device. The higher the similarity rating (e.g., the more similar the second end-point device is to the first end-point device), the closer to the patch success prediction for the second end-point device is to the patch success indication of the first end-point device. In various embodiments, the similarity rating affects the confidence value of the patch success predication. For example, a higher similarity rating indicates that the second end-point device is more similar to the first end-point device and as such, the patch success predication is more likely to mirror the patch success indication of the first end-point device.

In various embodiments, the first end-point device may determine patch success predications for a plurality of end-point devices (e.g., the second end-point device, a third end-point device, etc.). As such, the first end-point device may determine one or more end-point devices that are similar to the first end-point device and then determine patch success predictions for each end-point device. For example, in an instance in which a patch is successful on the first end-point device, the first end-point device may determine that the patch may also be successful on similar end-point devices.

Referring now to Block 316 of FIG. 3B, the method includes causing a transmission of the patch to the second end-point device in an instance in which the patch success prediction indicates a potential success. The patch success prediction may indicate a potential success in an instance in which the similarity rating is above a certain threshold and the patch success indication indicates the patch was successful on the first end-point device. For example, the patch may be categorized as a potential success for the second end-point device in an instance in which the second end-point device has one or more common applications with the first end-point device and the patch was successful on the first end-point device.

In various embodiments, the second end-point device may request the patch from the first end-point device (e.g., upon determining the first end-point device is the most similar end-point device with a potential patch). Additionally or alternatively, the first end-point device may transmit the patch to the second end-point device. The received patch may then be applied and/or otherwise integrated into the second end-point device.

In an instance in which the patch success prediction indicates a potential failure (e.g., the similarity rating is too low and/or the patch was unsuccessful on a similar end-point device), one or more other end-point devices may be contacted to determine whether any other end-point devices that are similar to the second end-point device has a functioning patch. For example, a similar end-point device may have a version of the patch that fixes issues caused by one or more application. In various embodiments, the system may determine one or more changes to the patch in order for the patch to be successful (e.g., the cause of the potential patch failure may be caused by a specific application and the system may generate a version of the patch that uses a known work-around to the problem caused by the given application).

Referring now to optional Block 318 of FIG. 3B, the method includes train and/or update a machine learning model and/or an AI model used to determine the similarity rating. In various embodiments, the ML/AI model(s) may have a local end-point device component and/or a global component. The global component may be consistent across each end-point device (e.g., trained and/or updated using various different data sets). The local end-point device may be a specific compliment to the global component that is specific to one or more end-point devices. For example, a given end-point device may process similar data multiple times, such that the local end-point device component may be updated and/or trained. In various embodiments, the local end-point device component may be stored locally on the given end-point device. The global component may be stored on the end-point device, a different end-point device, a remote system, and/or the like.

The machine learning model and/or an AI model may also be used to compare the device applications for a plurality of end-point devices to determine similar end-point devices. As such, the ML/AI model(s) may be trained and/or updated as discussed in reference to FIG. 2.

In various embodiments, the method includes training a machine learning model and/or an AI model to determine similarities between end-point devices. For example, known overlapping device applications for multiple end-point devices may be used as a training set to teach the ML/AI model(s). The ML/AI model(s) may then be trained using this information to determine similar end-point devices from a plurality of end-point devices.

In various embodiments, the method includes updating a machine learning model and/or an AI model to determine the similarities between end-point devices. The results of patch deployment may be compared to the patch success predication and the similarity ratings to determine the accuracy of the ML/AI model(s) and to update the ML/AI model(s) as needed. As such, the results of the operations here are used to improve the ML/AI model(s) for future operations.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for determining and managing software patch vulnerabilities via a distributed network, the system comprising:
- at least one non-transitory storage device containing instructions; and
- at least one processing device coupled to the at least one non-transitory storage device, wherein the at least one processing device being configured, upon execution of the instructions, to:
  - receive a transmission of a patch to be applied to a first end-point device associated with a network;
  - cause the patch to be applied to the first end-point device associated with the network;
  - in response to causing the patch to be applied to the first end-point device, monitor the first end-point device to collect one or more device metrics of the first end-point device;
  - determine a patch success indication of a patch applied to the first end-point device associated with the network based the one or more device metrics of the first end-point device, wherein the patch success indication is based on a change of the one or more device metrics between a first time before the patch was applied and a second time after the patch was applied;
  - determine a second end-point device that has at least one of one or more second device applications in common with one or more first device applications installed on the first end-point device;
  - calculate a similarity rating between the first end-point device and a second end-point device, wherein the similarity rating is based on a comparison of the one or more first device applications installed on the first end-point device and the one or more second device applications installed on the second end-point device;
  - determine a patch success prediction for the second end-point device, wherein the patch success prediction is based on the similarity rating between the first end-point device and the second end-point device and the patch success indication; and
  - cause a transmission of the patch to the second end-point device in an instance in which the patch success prediction indicates a potential success.

2. The system of claim 1, wherein the at least one processing device, upon execution of the instructions, is configured to determine the one or more first device applications installed on the first end-point device.

3. The system of claim 1, wherein the at least one processing device, upon execution of the instructions, is configured to determine the first end-point device from a plurality of end-point devices based on one or more common applications with the second end-point device.

4. The system of claim 1, wherein the at least one processing device, upon execution of the instructions, is configured to train a machine learning model to use to determine the similarity rating.

5. The system of claim 1, wherein the at least one processing device, upon execution of the instructions, is configured to determine one or more end-point devices of a plurality of end-point devices associated with the network to apply the patch based on at least one of the one or more first device applications, wherein the one or more end-point devices comprise the second end-point device and other end-point devices that each have at least one application in common with the one or more first device applications installed on the first end-point device.

6. The system of claim 1, wherein the patch success prediction indicates a potential success in an instance in which the similarity rating is above a certain threshold and the patch success indication indicates the patch was successful on the first end-point device.

7. A computer program product for determining and managing software patch vulnerabilities via a distributed network, the computer program product comprising at least one non-transitory computer-readable medium having computer-readable program code portions embodied therein, the computer-readable program code portions comprising one or more executable portions configured to:
- receive a transmission of a patch to be applied to a first end-point device associated with a network;
- cause the patch to be applied to the first end-point device associated with the network;
- in response to causing the patch to be applied to the first end-point device, monitor the first end-point device to collect one or more device metrics of the first end-point device;
- determine a patch success indication of a patch applied to the first end-point device associated with the network based on the one or more device metrics of the first end-point device, wherein the patch success indication is based on a change of the one or more device metrics between a first time before the patch was applied and a second time after the patch was applied;

determine a second end-point device that has at least one of one or more second device applications in common with one or more first device applications installed on the first end-point device;

calculate a similarity rating between the first end-point device and a second end-point device, wherein the similarity rating is based on a comparison of one or more first device applications installed on the first end-point device and one or more second device applications installed on the second end-point device;

determine a patch success prediction for the second end-point device, wherein the patch success prediction is based on the similarity rating between the first end-point device and the second end-point device and the patch success indication; and cause a transmission of the patch to the second end-point device in an instance in which the patch success prediction indicates a potential success.

8. The computer program product of claim 7, wherein the computer-readable program code portions comprising one or more executable portions are also configured to determine the one or more first device applications installed on the first end-point device.

9. The computer program product of claim 7, wherein the computer-readable program code portions comprising one or more executable portions are also configured to determine the first end-point device from a plurality of end-point devices based on one or more common applications with the second end-point device.

10. The computer program product of claim 7, wherein the computer-readable program code portions comprising one or more executable portions are also configured to train a machine learning model to use to determine the similarity rating.

11. The computer program product of claim 7, wherein the computer-readable program code portions comprising one or more executable portions are also configured to determine one or more end-point devices of a plurality of end-point devices associated with the network to apply the patch based on at least one of the one or more first device applications, wherein the one or more end-point devices comprise the second end-point device and other end-point devices that each have at least one application in common with the one or more first device applications installed on the first end-point device.

12. The computer program product of claim 7, wherein the patch success prediction indicates a potential success in an instance in which the similarity rating is above a certain threshold and the patch success indication indicates the patch was successful on the first end-point device.

13. A method for determining and managing software patch vulnerabilities via a distributed network, the method comprising:

receiving a transmission of a patch to be applied to a first end-point device associated with a network;

causing the patch to be applied to the first end-point device associated with the network;

in response to causing the patch to be applied to the first end-point device, monitoring the first end-point device to collect one or more device metrics of the first end-point device;

determining a patch success indication of a patch applied to the first end-point device associated with the network based on the one or more device metrics of the first end-point device, wherein the patch success indication is based on a change of the one or more device metrics between a first time before the patch was applied and a second time after the patch was applied;

determining a second end-point device that has at least one of one or more second device applications in common with one or more first device applications installed on the first end-point device;

calculating a similarity rating between the first end-point device and a second end-point device, wherein the similarity rating is based on a comparison of one or more first device applications installed on the first end-point device and one or more second device applications installed on the second end-point device;

determining a patch success prediction for the second end-point device, wherein the patch success prediction is based on the similarity rating between the first end-point device and the second end-point device and the patch success indication; and causing a transmission of the patch to the second end-point device in an instance in which the patch success prediction indicates a potential success.

14. The method of claim 13, further comprising determining the first end-point device from a plurality of end-point devices based on one or more common applications with the second end-point device.

15. The method of claim 13, further comprising training a machine learning model to use to determine the similarity rating.

16. The method of claim 13, further comprising determining one or more end-point devices of a plurality of end-point devices associated with the network to apply the patch based on at least one of the one or more first device applications, wherein the one or more end-point devices comprise the second end-point device and other end-point devices that each have at least one application in common with the one or more first device applications installed on the first end-point device.

17. The method of claim 13, wherein the patch success prediction indicates a potential success in an instance in which the similarity rating is above a certain threshold and the patch success indication indicates the patch was successful on the first end-point device.

* * * * *